(12) United States Patent  
Glugla

(10) Patent No.: US 9,879,622 B2
(45) Date of Patent: Jan. 30, 2018

(54) FUEL VAPOR FLOW BASED ON ROAD CONDITIONS

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 161 days.

(21) Appl. No.: 15/070,641

(22) Filed: Mar. 15, 2016

(65) Prior Publication Data
US 2017/0159587 A1 Jun. 8, 2017

Related U.S. Application Data

(60) Provisional application No. 62/264,438, filed on Dec. 8, 2015.

(51) Int. Cl.
F02D 41/00 (2006.01)
F02P 5/15 (2006.01)
(Continued)

(52) U.S. Cl.
CPC ......... F02D 41/0032 (2013.01); F02D 29/02 (2013.01); F02D 35/027 (2013.01); F02D 41/004 (2013.01); F02D 41/0077 (2013.01); F02D 41/1498 (2013.01); F02D 41/22 (2013.01); F02M 25/0854 (2013.01); F02P 5/152 (2013.01); F02P 5/1504 (2013.01);
(Continued)

(58) Field of Classification Search
CPC .... F02D 41/0032; F02D 41/22; F02D 41/004; F02D 41/0077; F02D 41/1498; F02D 29/02; F02D 13/0207; F02D 13/0249; F02D 2200/101; F02D 2200/701; F02D 2200/50; F02D 2200/702; F02D 2200/0406; F16H 61/143; F16H 63/46; F16H 2061/145; F02P 5/1504; F02M 25/0854; F02M 26/06; F02M 35/10229; F02M 35/10222
See application file for complete search history.

(56) References Cited

U.S. PATENT DOCUMENTS 3,142,967 A * 8/1964 Schweitzer ............. F01D 17/22
                                                    318/631
3,596,643 A * 8/1971 Schweitzer ............. F02D 9/00
                                                    123/406.23
(Continued)

OTHER PUBLICATIONS

Glugla, Chris Paul, "Fuel Vapor Flow Based on Road Conditions," U.S. Appl. No. 15/070,545, filed Mar. 15, 2016, 56 pages.

Primary Examiner — Hieu T Vo
Assistant Examiner — Sherman Manley
(74) Attorney, Agent, or Firm — Julia Voutyras; McCoy Russell LLP

(57) ABSTRACT

Methods and systems are provided for regulating engine operating parameters such as exhaust gas recirculation (EGR) based on road roughness conditions. Based on increased road roughness estimation, EGR flow rate may be opportunistically raised, enabling NVH associated with elevated EGR levels to be masked by NVH associated with rough road conditions. In addition, purging of fuel vapors from a canister or a crankcase to the engine may be increased while transmission shift schedules may be advanced so as to complete the shift during the rough road condition.

20 Claims, 6 Drawing Sheets

(51) Int. Cl.
    *F02D 41/14*    (2006.01)
    *F02M 25/08*    (2006.01)
    *F16H 63/46*    (2006.01)
    *F16H 61/14*    (2006.01)
    *F02D 41/22*    (2006.01)
    *F02D 29/02*    (2006.01)
    *F02P 5/152*    (2006.01)
    *F02D 35/02*    (2006.01)
    *F02D 13/02*    (2006.01)
    *F02M 35/10*    (2006.01)
    *F02M 26/06*    (2016.01)
    *F02P 5/04*    (2006.01)

(52) U.S. Cl.
    CPC ........... *F16H 61/143* (2013.01); *F16H 63/46* (2013.01); *F02D 13/0207* (2013.01); *F02D 13/0249* (2013.01); *F02D 2200/025* (2013.01); *F02D 2200/0406* (2013.01); *F02D 2200/101* (2013.01); *F02D 2200/50* (2013.01); *F02D 2200/701* (2013.01); *F02D 2200/702* (2013.01); *F02M 26/06* (2016.02); *F02M 35/10222* (2013.01); *F02M 35/10229* (2013.01); *F02P 5/045* (2013.01); *F16H 2061/145* (2013.01)

(56) References Cited

U.S. PATENT DOCUMENTS

| | | | | |
|---|---|---|---|---|
| 3,636,934 A * | 1/1972 | Nakajima | ............... | F02D 21/08 123/568.19 |
| 3,673,993 A * | 7/1972 | Nakajima | ............... | F02D 21/08 123/568.26 |
| 3,807,376 A * | 4/1974 | Glockler | ................... | F01N 3/20 123/568.19 |
| 3,872,846 A * | 3/1975 | Taplin | ................. | F02D 41/0052 123/436 |
| 4,186,701 A * | 2/1980 | Suzuki | .................. | F02B 77/085 123/435 |
| 4,190,029 A * | 2/1980 | Taplin | ................... | F02D 35/003 123/568.15 |
| 4,271,798 A * | 6/1981 | Seitz | .................... | F02D 41/1482 123/436 |
| 4,308,846 A * | 1/1982 | Cochard | ............ | G01M 15/102 123/568.11 |
| 4,344,140 A * | 8/1982 | Leung | ................ | F02D 41/1498 123/435 |
| 4,380,800 A * | 4/1983 | Wilkinson | ............ | F02D 35/023 123/478 |
| 4,789,939 A * | 12/1988 | Hamburg | ............ | F02D 41/1459 123/674 |
| 5,117,934 A * | 6/1992 | Tsuyama | ................. | B60T 8/172 180/197 |
| 5,694,901 A * | 12/1997 | Togai | .................... | B60W 40/06 123/436 |
| 6,202,011 B1 * | 3/2001 | Jeon | ..................... | B60G 17/015 280/5.515 |
| 7,251,990 B2 | 8/2007 | Taglialatela-Scafati et al. | | |
| 7,325,446 B1 | 2/2008 | Assaf et al. | | |
| 7,591,170 B2 * | 9/2009 | Lin | ....................... | B60W 40/06 73/105 |
| 7,739,019 B2 * | 6/2010 | Robert | .................... | F16H 59/66 280/5.512 |
| 8,229,642 B2 * | 7/2012 | Post, II | .............. | B60G 17/0165 280/5.512 |
| 8,744,726 B2 | 6/2014 | Cunningham et al. | | |
| 9,334,826 B2 * | 5/2016 | Wooldridge | ............ | F02D 43/00 |
| 2011/0120106 A1 | 5/2011 | Brück et al. | | |
| 2014/0137844 A1 * | 5/2014 | Yoshioka | ............ | F02M 25/0704 123/568.19 |

* cited by examiner

FUEL VAPOR FLOW BASED ON ROAD CONDITIONS

CROSS REFERENCE TO RELATED APPLICATION

The present application claims priority to U.S. Provisional Patent Application No. 62/264,438, entitled "EGR FLOW REGULATION BASED ON ROAD CONDITIONS," filed on Dec. 8, 2015, the entire contents of which are hereby incorporated by reference for all purposes.

FIELD

The present description relates generally to methods and systems for regulating flow of fuel vapors including exhaust gas recirculation (EGR) and purge fuel vapors based on road roughness conditions.

BACKGROUND/SUMMARY

Vehicles may be fitted with evaporative emission control systems to reduce the release of fuel vapors to the atmosphere. For example, vaporized hydrocarbons (HCs) from a fuel tank may be stored in a fuel vapor canister packed with an adsorbent which adsorbs and stores the fuel vapors. At a later time, when the engine is in operation, the evaporative emission control system allows the fuel vapors to be purged into the engine intake manifold from the fuel vapor canister. The fuel vapors are then consumed during combustion. In addition to canister fuel vapors, positive crankcase ventilation (PCV) fuel vapors may also be ingested and combusted in the engine during engine operation. By recycling the fuel vapors, engine fuel economy is improved.

Engine systems may also utilize recirculation of exhaust gas from an engine exhaust system to an engine intake system, a process referred to as exhaust gas recirculation (EGR), to reduce regulated emissions and improve fuel economy. EGR effectively cools combustion chamber temperatures thereby reducing NOx formation. Also, EGR reduces pumping work of an engine resulting in increased fuel economy.

One common issue with the purging of crankcase and canister hydrocarbons to an engine intake is the control of a combustion air-fuel ratio. In particular, due to misdistributions introduced by the ingested vapors, as well as large discrepancies in the estimation of fuel vapor concentrations from the canister and the crankcase, it may be difficult to control the air-fuel ratio of the cylinders where the vapors are introduced for combustion. As such, the air fuel imbalance can lead to degraded engine performance and elevated exhaust emissions. Further, the ingestion and combustion of the fuel vapor hydrocarbons can result in poor engine NVH characteristics. As a result, purge flow and crankcase ventilation flow levels may be limited to improve drivability and passenger comfort. Purge and crankcase ventilation efficiency may also be limited due to the presence of EGR flow. For example, when the engine is operating with EGR at higher levels, there may be insufficient manifold vacuum to draw in the canister and crankcase fuel vapors. Consequently, the engine's ability to leverage purge flow and PCV for attaining higher fuel economy is compromised.

The inventors herein have recognized that there may be conditions where drivability is reduced due to causes external to the vehicle, such as due to rough road conditions. During such conditions, the flow of purge and PCV vapors may be opportunistically raised since the operator may be unable to distinguish any NVH issues associated with the increased hydrocarbon ingestion (and combustion) levels from those associated with the rough road condition. In other words, any combustion instability generated by the increased purge flow can be better masked by the increased NVH from the rough road. EGR levels may also be opportunistically increased during the rough road conditions and coordinated with purge/PCV flow so as to provide sufficient manifold vacuum for drawing in the fuel vapors. The fuel economy potential of purge and/or PCV usage can be improved using an example method for an engine comprising: in response to an indication of road roughness, selectively adjusting one or more engine operating parameters to increase fuel economy, the selectively adjusting including transitioning from a first level associated with lower NVH and combustion instability to a second level associated with higher NVH and combustion instability. For example, the method may include selectively increasing a flow rate of fuel canister hydrocarbons and/or crankcase ventilation hydrocarbons being purged to the engine.

As an example, road roughness conditions may be monitored using input from a plurality of sensors. These may include, as non-limiting examples, crankshaft acceleration sensors, wheel speed sensors, dynamic suspension system sensors including yaw-rate sensors, steering wheel sensors, etc. During smoother road conditions, purge and/or PCV flow may be lowered from a target level in order to reduce potential NVH issues associated with higher hydrocarbon ingestion levels. In comparison, during rougher road conditions, purge and/or PCV flow may be opportunistically raised to or above the target level. Likewise, during rough road conditions, EGR flow may also be opportunistically raised. However, a degree of increasing the EGR level may be limited based on the intake manifold vacuum level. Thus, when the available intake manifold vacuum level is higher, while purge and/or PCV flow is increased, EGR flow may be increased to a higher degree. In comparison, when the available intake manifold vacuum level is lower, while purge and/or PCV flow is increased, EGR flow may be increased to a lower degree (or not increased) so as to provide sufficient manifold vacuum for the purge and/or PCV flow.

It will be appreciated that one or more additional engine operating parameters that improve fuel economy but cause increased NHV or combustion instability at higher levels may also be concurrently adjusted during the rough road conditions. For example, transmission gear shift schedule may be advanced so that the gear shift can be completed during the rough road conditions. As another example, less spark retard may be used during the gear shift schedule. As yet another example, a torque convertor lock-p clutch may be slipped less during the gear shift schedule. Further still, during the rough road condition, while purge flow and EGR flow is elevated, knock and pre-ignition thresholds may be adjusted to correspond to thresholds that have more spark advance. Likewise, exhaust cam phasing in a variable cam timing (VCT) engine may be adjusted.

In this way, by increasing one or more parameters such as fuel vapor canister purge frequency, positive crankcase ventilation flow, EGR delivery, use of spark retard during gear shift schedule, torque convertor slip schedule and exhaust cam phasing, etc., during conditions of elevated road roughness, higher engine fuel economy may be achieved without an additional increase in NVH for the vehicle occupants. By enabling NVH associated with elevated ingestion and combustion of fuel vapor hydrocarbons (such as from elevated purge levels, for example) to be better masked by NVH associated with rough road conditions, a higher fuel vapor usage may be enabled, improving engine performance. By increasing purging frequency, fuel vapor canister cleaning efficiency over a vehicle drive cycle is improved. As such, the increased fuel vapor usage during rough road conditions may be particularly advantageous in global markets where road conditions are generally poor. The technical effect of adapting engine operating parameters responsive to rough road conditions to improve fuel economy is that higher fuel economy and improved emissions benefits may be achieved without any noticeable increase in NVH.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
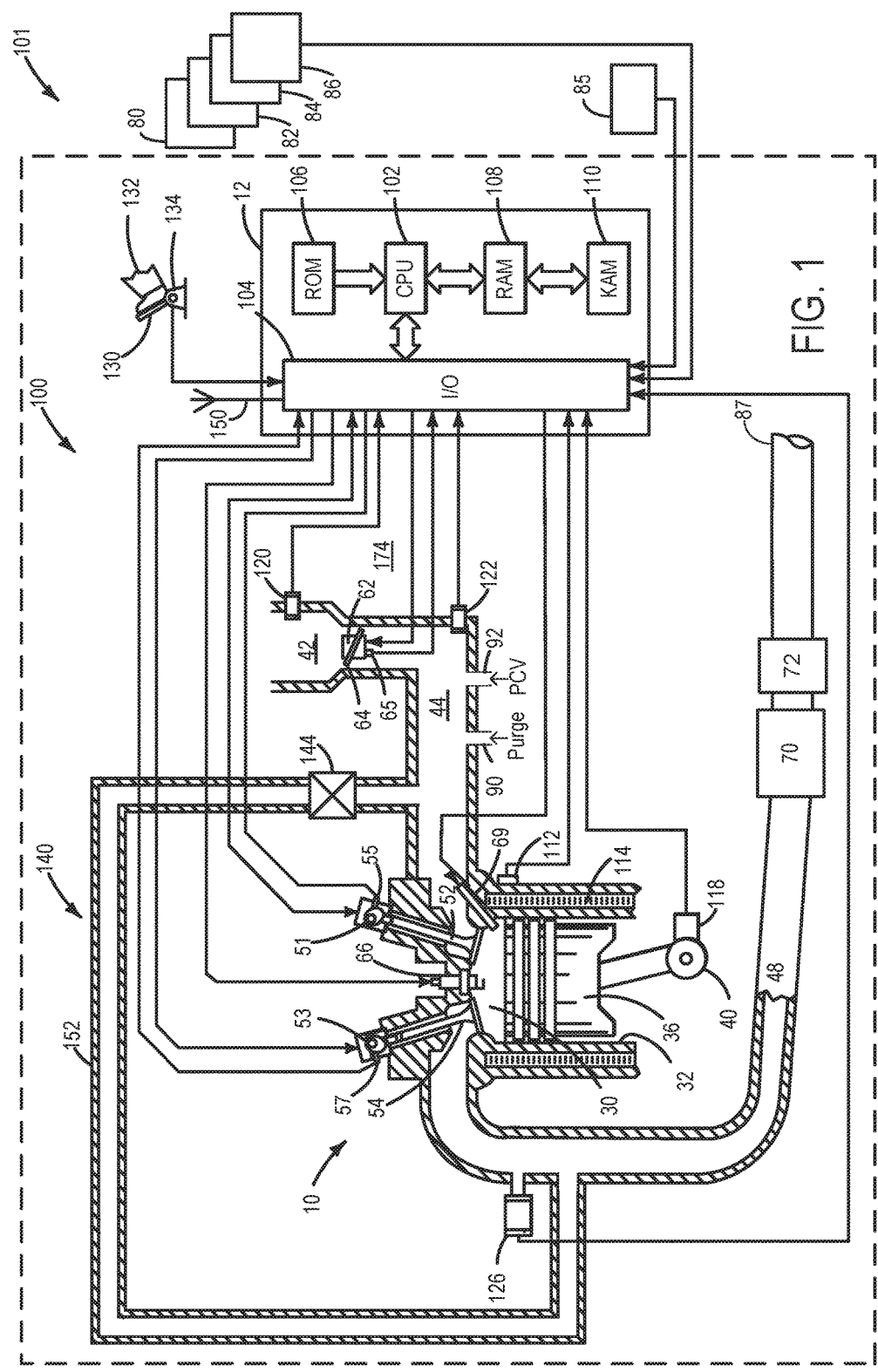
FIG. 1 shows an example vehicle system including an internal combustion engine and sensors for measuring road roughness.

The following description relates to systems and methods for regulating engine operating parameters that increase fuel economy, such as exhaust gas recirculation (EGR) and purge frequency, based on engine operating conditions and road roughness conditions. A vehicle system comprising an internal combustion engine and a plurality of sensors for measuring road roughness conditions is shown in FIG. 1. An engine controller is configured to perform a control routine, such as the example routine of FIG. 2, to adjust one or more engine operating associated with improved fuel economy at elevated NVH during rough road conditions. As a non-limiting example, an EGR flow rate may be opportunistically increased during rough road conditions, as elaborated at FIGS. 3-4. In still other examples, such as at the example routine of FIG. 5, a purge flow rate may be coordinated with adjustments to an EGR flow rate to opportunistically improve fuel economy at the cost of increased NVH or combustion instability during rough road conditions. Example adjustments during vehicle travel are shown at FIG. 6.

FIG. 1 is a schematic diagram showing one cylinder of a multi-cylinder engine 10 in an engine system 100. The engine system 100, may be coupled inside a propulsion system of an on road vehicle system 101. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 includes a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

In one example, engine 10 may be a boosted engine system wherein intake air received in engine cylinders are compressed by an intake compressor (not shown). When included, the intake compressor may be a supercharger compressor driven by a motor or a turbocharger compressor driven by an exhaust turbine. Alternatively, engine 10 may be naturally aspirated.

The combustion chamber 30 may receive intake air from an intake manifold 44 via an intake passage 42 and may exhaust combustion gases via an exhaust passage (e.g., exhaust pipe) 48. The intake manifold 44 and the exhaust pipe 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber (as shown) or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust pipe 48 upstream of both an exhaust gas recirculation system 140 and an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is UEGO configured to provide output, such as a voltage signal, that is proportional to the amount of oxygen present in the exhaust. Controller 12 converts oxygen sensor output into exhaust gas air-fuel ratio via an oxygen sensor transfer function.

An exhaust gas recirculation (EGR) system 140 may route a desired portion of exhaust gas from the exhaust pipe 48 to the intake manifold 44 via an EGR passage 152. EGR reduces pumping work of an engine resulting in increased fuel economy. In addition, EGR effectively cools combustion chamber temperatures thereby reducing NOx formation and improving emissions quality. EGR may also be used to regulate the temperature of the air-fuel mixture within the combustion chamber, thus providing a method of controlling the timing of ignition during some combustion modes. In the depicted example, the EGR delivered is a low-pressure EGR (LP-EGR), wherein a portion of exhaust gas from the exhaust pipe 48 may be delivered from downstream of a turbocharger turbine to the engine intake manifold 44, upstream of a turbocharger compressor. In an alternate example, the EGR delivered may be a high-pressure EGR (HP-EGR), wherein a portion of exhaust gas from the exhaust pipe 48 may be delivered from upstream of a turbocharger turbine (not shown) to the engine intake manifold 44, downstream of a turbocharger compressor (not shown).

In addition to exhaust gases, fuel vapors hydrocarbons may also be delivered to the engine intake manifold 44 for combustion in cylinder 30. For example, fuel vapors stored in a fuel vapor canister (coupled to a fuel tank of the engine's fuel system) may be intermittently purged to the engine intake manifold via purge port 90. The fuel vapors stored in the canister may include refueling vapors, as well as diurnal fuel vapors. Purge flow (including air and canister fuel vapors) along purge port 90 may be controlled via a purge valve (also known as a canister purge valve, not shown). In one example, purge flow may be enabled responsive to a hydrocarbon load of a fuel system canister being higher than a threshold load. In another example, purge flow may be enabled during selected engine operating conditions when air-fuel excursions induced by the ingestion of fuel vapors can be minimized.

Likewise, during positive crankcase ventilation, intake air may be blown through an engine crankcase, and a crankcase flow of air and hydrocarbons (e.g., fuel and oil) may be purged to the engine intake manifold via PCV port 92. Crankcase flow along PCV port 92 may be controlled via a PCV valve (not shown). As with purge flow, PCV flow may be enabled during selected engine operating conditions when air-fuel excursions induced by the ingestion of fuel vapors can be minimized.

The amount of EGR (LP-EGR or HP-EGR) provided to the intake manifold 44 may be determined based on engine operating conditions and further based on NVH constraints. NVH constraints may be based on road roughness conditions and engine roughness conditions. Maximum permissible (target level) EGR flow rate may be determined for a given set of engine operating conditions, such as based on engine speed and load. However, during high EGR flow rates, there may be an increase in vehicle NVH due to poor combustion. Accordingly, an engine control system may operate the engine with sub-optimal levels (lower than the target level) of EGR to improve vehicle drivability and reduce operator dissatisfaction. For example, for a given engine speed-load condition, the actual EGR delivered may be lower than the maximum permissible or target EGR for the given speed-load condition, the actual EGR limited from the target EGR based on an amount of combustion instability generated. As an example, in response to an indication of engine roughness, as indicated by an increase in misfire events, EGR may be lowered from the target EGR.

As a consequence of the EGR being limited, the full fuel economy potential of EGR in an engine may be reduced. However the inventors herein have recognized that during rough road conditions, EGR flow may be selectively increased to the target level as the NVH resulting from the elevated EGR may be masked by the NVH resulting from the rough road conditions. This is elaborated herein with reference to FIGS. 2-4. Consequently, a vehicle operator may not perceive any further change in NHV due to the increased EGR levels while higher fuel economy is achieved.

In the same manner, the amount of purge flow or PCV flow provided to the intake manifold 44 may be determined based on engine operating conditions and further based on NVH constraints. NVH constraints may be based on road roughness conditions and engine roughness conditions. A maximum permissible (target level) purge and/or PCV flow rate may be determined for a given set of engine operating conditions, such as based on engine speed and load, and further based on canister load. However, during high purge and/or PCV flow rates, there may be an increase in vehicle NVH due to misdistribution of the ingested fuel vapors and poor combustion. Accordingly, an engine control system may operate the engine with sub-optimal levels (lower than the target level) of purge and/or PCV flow to improve vehicle drivability and reduce operator dissatisfaction. For example, for a given engine speed-load condition, the actual purge flow delivered may be lower than the maximum permissible or target purge flow for the given speed-load condition, the actual purge flow limited from the target purge flow based on an amount of combustion instability generated. As an example, in response to an indication of engine roughness, as indicated by an increase in misfire events, purge flow may be lowered from the target flow. In another example, purge may be disabled responsive to the increase in misfire events.

As a consequence of the purge and/or PCV flow being limited, the full fuel economy potential of fuel vapor ingestion in an engine may be limited. However the inventors herein have recognized that during rough road conditions, purge and/or PCV flow may be selectively increased to (or towards) the target level as the NVH resulting from the elevated fuel vapor flow may be masked by the NVH resulting from the rough road conditions. In addition, a controller may coordinate the EGR flow adjustment responsive to the rough road conditions with the purge and/or PCV flow adjustment responsive to the rough road conditions so that sufficient intake manifold vacuum is available for drawing in the fuel vapors into the intake. This is elaborated herein with reference to FIGS. 5-6. Consequently, a vehicle operator may not notice any further change in NHV due to the increased fuel vapor flow while higher fuel economy is achieved.

Rough road conditions may be detected based on the output of various vehicle sensors coupled external to the engine. As non-limiting examples, sensors used for estimating road roughness may include wheel speed sensor(s) 80 positioned at one or more of the four wheels, steering wheel sensor 82 coupled to the shaft of a steering wheel operated by the driver, and yaw-rate sensor 84 provided as part of a dynamic suspension system of the vehicle. Further, horizontal and vertical acceleration sensors 86 may be used, the sensors positioned near a center of gravity of the vehicle. Still other sensors include a crankshaft acceleration sensor, a suspension sensor, and a wheel slip sensor. Readings from one or more of the above-mentioned sensors may be combined to determine a degree of roughness of the road on which the vehicle is travelling.

Further still, road roughness may be inferred based on navigational input. A navigational system 85 may be coupled to the controller 12. The navigational system 85 may be used to obtain information regarding route and road conditions from an external source such as an external sever, during vehicle operation. The controller 12 may also be coupled to a wireless communication device 150 for communication of the vehicle 101 with other on-road vehicles via vehicle to vehicle (V2V) technology.

In comparison, engine roughness may be based on a reading of a tachometer coupled to a crankshaft driven member. Engine roughness may also be estimated from increase in misfire count during vehicle operation or an increase in another parameter indicative of combustion instability. Further still, engine roughness may be determined based on crankshaft acceleration, ionization, or cylinder pressure. In some examples, road roughness may be estimated based on the output of the various vehicle sensors in combination with the output of various engine sensors. In other words, road roughness may be inferred based on vehicle conditions in combination with engine roughness data.

As elaborated herein, in response to the indication of rough road conditions, one or more engine operating parameters may be adjusted to improve fuel economy. The one or more engine operating parameters may be parameters associated with higher levels of fuel economy at the cost of higher levels of NVH and combustion instability. That is, when their levels are increased, fuel economy is improved while leading to combustion instability, and consequently they may be maintained at lower levels during all other conditions. As one example, the EGR delivered to the engine may be selectively increased (e.g., by increasing an EGR flow rate, or absolute EGR amount, or EGR dilution rate) during rough road conditions. Herein, any increase in NVH or combustion instability associated with the elevated EGR levels may be masked by the road roughness allowing the higher fuel economy potential of the EGR to be attained. In another example, a purge frequency of the fuel system canister may be increased with purge flow enabled (if it was disabled) or increased (if it was already enabled) responsive to the rough road condition. In yet another example, a gear shift or transmission shift may be scheduled during the rough road condition without the use of spark retard (or with use of less spark retard), with any roughness associated with the gear/transmission shift masked by the rough road condition. Herein, a fuel cost associated with providing a smooth gear shift is reduced. Additionally or optionally, the gear shift schedule may be advanced so that the gear shift can be completed during the rough road condition. Still other examples are described herein.

Returning to the adjusting of the EGR during rough road conditions, the selective increasing of EGR may include increasing the EGR flow rate responsive to the indication of road roughness being higher than a threshold. Herein, the EGR flow rate may be increased from a first EGR level based on engine speed-load conditions and an engine NVH limit to a second EGR level based on the engine speed-load conditions and independent of the engine NVH limit. The first EGR level may be stored in a controller's memory in a look-up table, and the limiting may be relative to the first level, as a function of the first level. EGR flow rate may be varied by the controller 12 via an EGR valve 144. EGR valve 144 may be configured as a continuously variable valve, or an on/off valve. In response to input from a vehicle sensor regarding a rough road condition, the controller may send a signal to an actuator coupled to the EGR valve to move the EGR valve to a more open position.

Likewise, the selective increasing of the purge flow and/or PCV flow during rough road conditions may include increasing the purge/PCV flow rate responsive to the indication of road roughness being higher than a threshold. Herein, the purge/PCV flow rate may be increased from a first level based on engine speed-load conditions and an engine NVH limit to a second level based on the engine speed-load conditions and independent of the engine NVH limit. The first level may be stored in a controller's memory in a look-up table, and the limiting may be relative to the first level (and as a function of the first level). Purge flow rate may be varied by the controller 12 via a canister purge valve that is configured as a continuously variable valve or an on/off valve. In response to input from a vehicle sensor regarding a rough road condition, the controller may send a signal to an actuator coupled to the purge valve to move the purge valve to a more open position. At the same time, the controller may send a signal to an actuator coupled to the EGR valve to move the EGR valve to a relatively less open position so that sufficient intake manifold vacuum can be generated for drawing in the purge fuel vapors.

The emission control device 70 is shown in FIG. 1 arranged along the exhaust pipe 48, downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio. A particulate filter 72 is shown arranged along the exhaust pipe 48 downstream of the emission control device 70. Exhaust gas treated by emission control device 70 and particulate filter 72 is released into the atmosphere through tailpipe 87. The particulate filter 72 may be a diesel particulate filter or a gasoline particulate filter.

The controller 12 is shown in FIG. 1 as a microcomputer, including a microprocessor unit 102, input/output ports 104, an electronic storage medium for executable programs and calibration values shown as read only memory chip 106

(e.g., non-transitory memory) in this particular example, random access memory 108, keep alive memory 110, and a data bus. The controller 12 may receive various signals from sensors coupled to the engine 10, in addition to those signals previously discussed, measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal and crankshaft acceleration may be generated by the controller 12 from crankshaft position sensor 118. Vehicle wheel speed may be estimated from the wheel speed sensor(s) 80 and the steering movements of the vehicle may be determined from the steering wheel sensor 82. The angular velocity and slip-angle of the vehicle may be measured using the yaw-rate sensor 84. Acceleration sensors 86 may provide acceleration estimates in both horizontal and vertical directions. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller 12. In one example, during increase in road roughness conditions, the controller 12 may send a signal to an actuator coupled to an EGR valve 144 to increase the opening of the EGR valve 144 in order to increase EGR flow rate.

Figure 2:
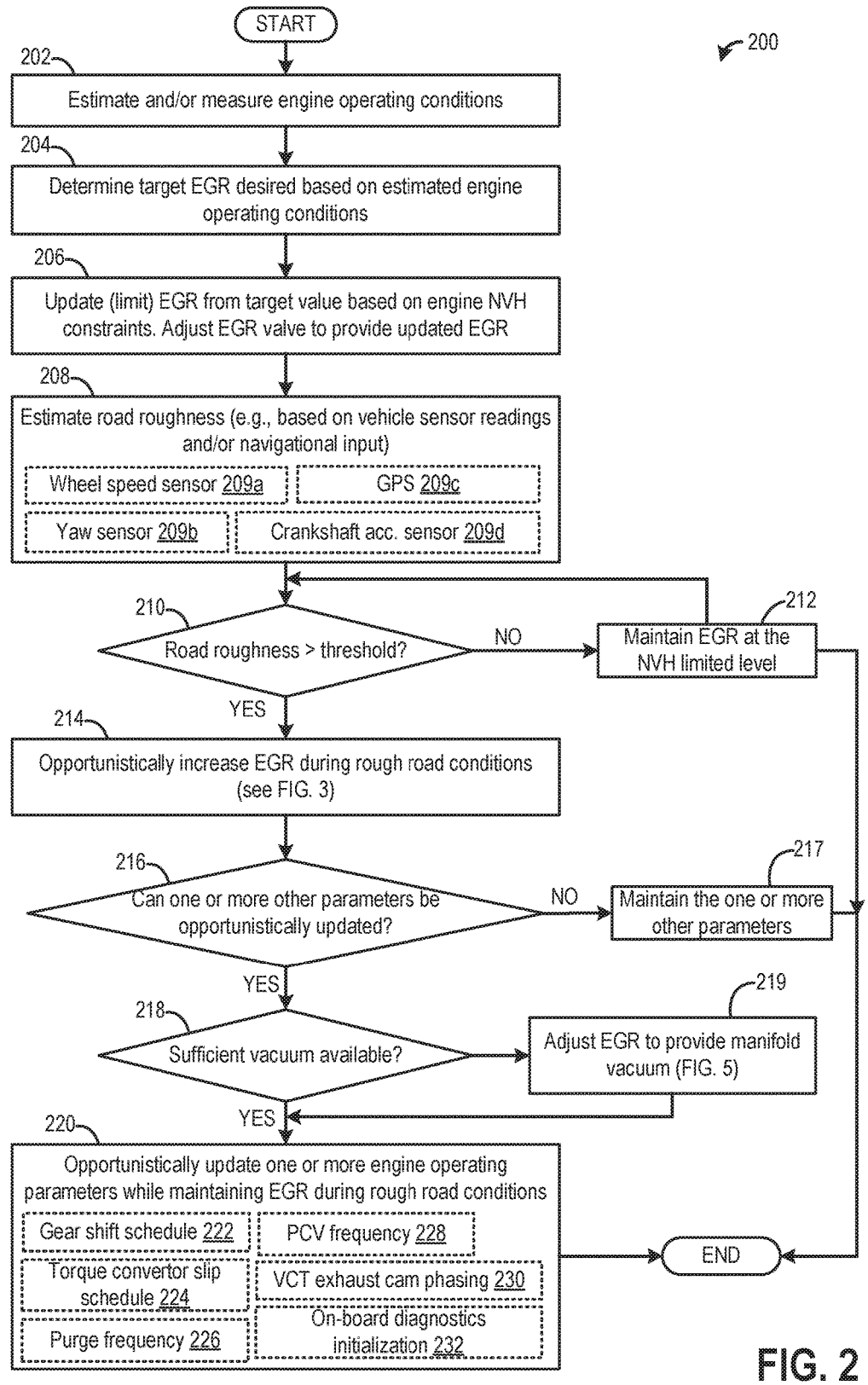
FIG. 2 shows a flow chart illustrating a method that may be implemented for adjusting engine operating parameters responsive to rough road conditions.

FIG. 2 illustrates an example method 200 for opportunistically adjusting one or more engine operating parameters, such as an EGR flow rate and a purge frequency, in real-time based on conditions of a road on which a vehicle is travelling. Instructions for carrying out method 200 may be executed by a controller based on instructions stored on a memory of the controller and in conjunction with signals received from sensors of the engine system and the vehicle system, such as the sensors described above with reference to FIG. 1. The controller may employ engine actuators of the engine system to adjust engine operation, according to the methods described below.

At 202, the routine includes estimating and/or measuring current engine operating conditions. Conditions assessed may include, for example, engine load, engine speed, vehicle speed, engine temperature, throttle position, exhaust pressure, exhaust air/fuel ratio, ambient conditions (such as ambient temperature, pressure, and humidity), etc. Next, at 204, one or more engine operating parameters may be determined based on the estimated engine operating conditions. The one or more engine operating parameters may include an exhaust gas recirculation (EGR) schedule, a purge frequency, a gear/transmission shift schedule, etc. The various operating parameters may be adjusted for improved fuel efficiency and engine performance.

In one example, at 204, determining the EGR schedule includes determining the maximum permissible (target level) for an EGR flow rate, based on the estimated engine operating conditions. As an example, the controller may retrieve the target level value from a look-up table referenced by engine speed and load. EGR rate may be regulated based on engine temperature, engine speed, engine load and a plurality of parameters. Likewise, the controller may retrieve a target purge frequency based on engine speed-load conditions and further based on canister load. The controller may also determine a gear/transmission shift schedule including a timing of the shift, an initial and final gear, as well as an amount of spark retard required to provide a smooth shift. Herein, the target values of engine operating parameters such as EGR, purge flow rate, transmission shift schedule, etc., may be determined to provide a maximum fuel economy potential of the parameter for the given engine speed-load condition.

At 206, the operating parameter may be adjusted or updated from the initially determined level (that is optimized for fuel economy) based on NVH and combustion stability constraints. In particular, there may be NVH and/or combustion instability associated with providing the operating parameter at the target level, the NVH being objectionable to a vehicle operator. Accordingly, the parameter may be modified (e.g., limited) so to improve the vehicle driveability even though this may limit the fuel economy potential of the parameter. As an example, the EGR level may be limited based on NVH constraints. For example, for a given engine speed-load condition, the controller may determine that an EGR level at or greater than 20% (e.g., at 25%) is desired to achieve improved fuel economy and reduction in exhaust NOx levels. However, at this higher target EGR level, there may be elevated noise-vibration-harshness (NVH) which may be unacceptable to a vehicle operator. In addition, there may be increased combustion instability associated with the higher target EGR level. In order to improve drivability, the actual EGR levels provided may be limited relative to the target level (that is, the maximum permissible level for the given engine speed-load condition). For example, the EGR actually provided may be reduced from 25% to 20%. The reduction in the EGR level may be based on an estimate of engine roughness resulting from or expected at the elevated EGR level. For example, as an actual or predicted engine misfire count of the engine increases, the EGR level may be reduced from the target level. In an alternate example, the reduction in the EGR level may not run the engine into a misfire condition but just below it. In this way, the actual EGR flow rate provided is adjusted based on both engine operating conditions and NVH constraints. The EGR valve is then adjusted to deliver the estimated amount of EGR to the engine intake manifold. For example, the controller may send a signal to actuate an actuator coupled to the EGR valve, the actuator regulating the opening of the EGR valve to the updated position.

As another example, a target canister purge frequency may be determined based on the engine speed-load condition and further based on the canister load at 204. Then, at 206, the purge frequency may be reduced (e.g., by reducing a pulse width of the canister purge valve's duty cycle) in anticipation of NVH associated with air-fuel ratio excursions during the ingestion of purge fuel vapors and misfire events at the higher purge frequency.

As still other examples, elaborated below, an initially determined transmission gear shift schedule may be adjusted (e.g., delayed), and/or the running of an intrusive OBD routine may be adjusted (e.g., the routine may not be run or may be run less frequently) based on engine NVH considerations.

At 208, road roughness conditions are estimated based on inputs from a plurality of vehicle sensors. In one example, a road roughness index may be determined. The indication of road roughness may be based on one or more of crankshaft acceleration, a wheel speed sensor 209a, a suspension sensor, a steering sensor, wheel slippage, and yaw. For example, one or more of crankshaft acceleration as measured by the crankshaft position sensor 209d, vehicle wheel speed as estimated by the wheel speed sensor(s) 209a, steering movements as determined from the steering wheel sensor, angular velocity and slip-angle of the vehicle as measured by the yaw-rate sensor 209b, and horizontal and vertical accelerations as measured by the acceleration sensors may be utilized in estimating road roughness conditions. Road roughness estimation may also be based on input from additional engine sensors. Alternatively, the indication of road roughness may be based on navigational input. In one example, the controller on-board the vehicle may include a navigation system (e.g., global positioning system, GPS 209c) via which a location of the vehicle (e.g., GPS co-ordinates of the vehicle) may be transmitted to an external server over a network. Based on the location of the vehicle, local road roughness conditions for that location may be retrieved from the external server. Further still, the navigation system may be used to plan a vehicle route of travel and based on the planned route, road conditions for the entirely of the route may be retrieved. This may include receiving an estimate of regions of the planned route where the expected road roughness is higher (e.g., road roughness index is higher) and regions of the planned route where the expected road roughness is lower (e.g., road roughness index is lower).

In another example, the on-board vehicle controller may be communicatively coupled to the on-board controller of one or more other vehicles, such as using vehicle to vehicle (V2V) communication technology. The one or more other vehicles may include other vehicles within a threshold radius of the given vehicle and having the same make or model. Road roughness conditions may be retrieved from one or more vehicles within a threshold radius of the given vehicle. For example, a statistical or weighted average of the values retrieved from one or more vehicles may be used to estimate the road roughness conditions (or road roughness index). The road roughness condition/index as estimated by the controller may then be compared to a pre-determined threshold value for roughness.

At 210, the routine includes determining if the estimated road roughness is greater than the predetermined threshold. For example, it may be determined if the road roughness index is higher than the predetermined threshold. When the road roughness index is higher than the threshold, there may be an opportunity to increase the level of one or more engine operating parameters, such as the EGR level and the purge frequency, since the increased NVH due to the road roughness may mask any NVH resulting from an increase in the operating parameter (such as the EGR). In one example, it may be determined that the road roughness index is higher than the threshold when a change in steering angle is higher than a threshold angle, when a yawing rate is higher than a threshold rate, when wheel speed is higher than a threshold speed and/or when crankshaft acceleration is higher than a threshold acceleration.

If it is determined that the road roughness index is lower than the threshold, at 212, the NVH limited level of the one or more engine operating parameters is maintained. For example, the EGR flow rate may be maintained at the NVH constrained level determined at 206. Therefore responsive to the indication of road roughness being lower than the threshold, the EGR flow rate and/or the purge frequency is maintained (at the lower level). Also at 212, the operation of an engine misfire monitor is also maintained. Maintaining the engine misfire monitor includes continuing to infer engine misfire events based on, for example, engine crankshaft acceleration and engine vibrations. By maintaining the engine misfire monitor, the NVH constraints for each parameter may be learned.

If it is determined at 210 that the road roughness index is greater than the threshold, at 214, the routine includes opportunistically increasing the EGR flow rate during rough road conditions to improve fuel economy and emissions quality. Increasing the EGR flow rate includes providing EGR at or above the target EGR rate (determined earlier at 204). In other words, EGR may be provided without being constrained by NVH. The increase in EGR level may be based on the engine speed-load conditions and independent of the engine NVH limit. Details regarding increasing the EGR flow rate in relation to road roughness conditions and other engine operating conditions are discussed in detail with reference to FIG. 3.

Increasing the EGR flow rate at 214 may include increasing an opening of the EGR valve coupled in a low pressure EGR passage. For example, based on input from a steering sensor, yaw sensor, or wheel sensor indicative of rough road conditions, the controller may send a signal to an actuator coupled to the EGR valve to increase the opening of the EGR valve. By increasing the EGR flow rate to the target level, engine fuel economy is improved. At the same time, any increase in engine roughness due to a drop in combustion quality at the higher EGR level may be masked by the NVH associated with rough road conditions and therefore may not be perceptible to the vehicle operator. At 214, while operating the engine with the increased EGR flow rate, one or more of a knock threshold and a pre-ignition threshold of an engine knock sensor may be raised.

Furthermore, the increasing in EGR may be adjusted responsive to an indication of engine roughness. Specifically, during the rough road condition, the EGR levels may be increased until just under a misfire limit for EGR. If misfires are detected while providing the elevated EGR level, the increase in EGR may be limited or reduced to the misfire limit level of EGR. The limit may be a mapped limit, including a safety margin for misfire/poor combustion in the presence of noise factors (such as humidity, and part to part variation).

At 216, it may be determined if one or more other engine operating parameters may also be opportunistically updated during the rough road conditions. For example, it may be determined if one or more of a canister purge frequency 226, PCV frequency 228, a transmission gear shift schedule 222, a torque convertor slip schedule 224, an on-board diagnostic routine initialization 232, and a VCT exhaust cam phasing 230 can be updated. If they cannot be updated, then at 217, the method includes maintaining the one or more other parameters at the NVH constrained level, as determined at 206. Else, if conditions are present for updating the parameter, at 218, it may be determined if there is sufficient intake manifold vacuum available to enable the parameter to be updated. As such, this step may be applied selectively for engine operating parameters having vacuum actuators. For example, if it is determined (at 217) that the purge flow/frequency and/or the PCV flow can be increased, then it may be determined (at 218) if there is sufficient intake manifold vacuum for providing the target purge flow and/or PCV flow (as determined at 204). In one example, there may be insufficient engine vacuum when the EGR flow is elevated.

Thus, if sufficient vacuum is not available, then at 219, the EGR flow rate may be further adjusted to provide sufficient manifold vacuum. As elaborated with reference to FIG. 5, this includes reducing the EGR level from the target level while maintaining the EGR level above the NVH constrained level. The method then moves to 220. Else, if sufficient vacuum is available, the method proceeds to 220 directly.

At 220, the one or more other engine operating parameters are opportunistically updated to improve fuel economy and engine performance. The parameters may include (but are not limited to) use of spark retard during a transmission gear shift schedule 222, torque convertor slip schedule 224, purge frequency 226, PCV frequency 228, altering exhaust cam phasing 230 in a variable cam timing (VCT) engine, and initialization of on-board diagnostic routines 232. Any increase in NVH experienced due to a change in one or more of the above-mentioned parameters would be masked by the increased NVH levels associated with the rough road conditions.

For example, a purge or PCV frequency may be increased allowing for more purge flow/PCV flow vapors to be ingested in the engine during rough road conditions. As another example, a transmission gear shift may be scheduled earlier during the rough road condition so that they can be completed during the rough road condition. In addition, they may be scheduled with the use of less spark retard. As yet another example, on-board diagnostic monitors that may be intrusive and cause potential NVH concerns may be initialized during rough road conditions without causing any noticeable deterioration in NVH levels. As yet another example, if a torque converter slip was scheduled to eliminate NVH, less slip (or more lock-up) may be scheduled to reduce fuel loss. For example, a lock-up clutch of the torque converter may be configured to slip less during the gear shift. As still another example, an engine knock threshold may be raised to a level that allows for the use of more spark advance. Likewise, an engine pre-ignition threshold may be raised to allow for improved pre-ignition detection in the presence of rough road conditions. As with the increase in EGR, the adjustment of each of the other operating parameters may be increased until engine misfires are indicated, and then the increase may be capped or limited. For example, EGR may be reduced under the misfire limit.

For example, the inventors herein have recognized that the increasing regulation for fuel economy and emissions include government regulations for diagnostic monitors. Some of these monitors can be difficult to run as they may have poor signal to noise ratio in many areas of vehicle operation. For example the air fuel ratio imbalance monitor has to monitor a bank of cylinders, and identify if a cylinder has an air fuel error leading to an error for the bank that results in exceeding emission regulations by 1.5× the standard. As a result, some of these monitors can only run under a limited range and not diagnose specific degradations even though they may be able to if the monitor could intrusively perturb outputs to measure a response. This may not be possible due to negative implications to NVH and engine smoothness. However, during rough road conditions, intrusive monitors may be performed, where the customer may not notice them. For example an injector may be leaned by reducing the amount of injected fuel and measuring the response of an exhaust gas (e.g., UEGO) sensor to see if it measures the amount of adjustment. This may create a lean unstable combustion point that would be noticed by the customer, however, since the vehicle is operating in rough road conditions, the customer may no longer notice the combustion stability. This allows these intrusive diagnostic monitors to be able to provide a better signal to noise ratio, increasing the accuracy of the diagnostic monitor. For example, issues with a specific cylinder may be identified in lieu of an entire bank, resulting in less parts that need to be addressed. In one example, based on the intrusive running of the monitor, only one fuel injector may need to be changed instead of all of the fuel injectors on a bank of cylinders. In addition, by allowing the monitor to be initialized and possibly completed during rough road conditions, the initialization and completion statistics of the monitor over a vehicle drive cycle are improved.

Likewise, the inventors have recognized that the increasing regulation for fuel economy and emissions have led to many new technologies being developed for spark ignition gasoline engines. For example, transmissions can either slip the lock up clutch, or lock and unlock the torque convertor during gear shifting to make shifts feel smooth. Additionally, to make shifts smooth, large spark retard may be used to match torque levels before and after a gear change. Both slipping and opening of the torque convertor clutch, and large spark retard from MBT result in decreased fuel economy. Another example may be the engine lug limit. At low engine speed and moderate load the vehicle may vibrate, and lug resulting in poor NVH characteristics. Typically this is mitigated by slipping or opening the torque convertor clutch allowing the engine speed to be raised relative to wheel speed avoiding the lugging area. However, during rough road conditions, a torque convertor slip or lock up schedule can be modified, as well as the spark retard used for torque control can be adjusted. Since it will be difficult for the customer to discern the rough road NVH from the powertrain NVH, the powertrain could be operated more efficiently. For example when on a rough road, during a shifting event, the torque converter may be left locked, or slipped less (e.g., 10% on a rougher road vs 20% on a smoother road), the slippage depending on the roughness of the road. Also during the shift events, spark may be retarded less for torque matching (e.g., 25 deg. retarded from MBT on a rougher road vs 35 deg. retarded from MBT on a smoother road). Similar slip percentage changes could also be done during the lugging period. All these modifications result in improved fuel economy, which may provide customers more real world fuel economy improvement where roads are unimproved, or benefit customers in countries where road conditions are poor, and improved fuel economy is appreciated.

It will be appreciated that as with EGR, the one or more other engine operating parameters may be adjusted (e.g., increased) until a misfire count becomes higher than a threshold. Thereafter, the parameter may be reduced. Specifically, if misfires are detected while providing the elevated purge level, the increase in purge flow may be limited or reduced to the misfire limit level of purge. The limit may be a mapped limit, including a safety margin for misfire/poor combustion in the presence of noise factors (such as humidity, and part to part variation).

In this way it is possible to change engine operating parameter during rough road conditions, thereby improving engine performance. In one example, during a first condition, in response to an indication of engine roughness, an amount of EGR delivered to an engine may be decreased, whereas, during a second condition, in response to an indication of road roughness, the amount of EGR delivered to the engine may be increased. During the first condition, decrease in EGR flow rate may be based on engine operation relative to an engine combustion stability limit while during the second condition, the increase in EGR flow rate may be based on engine operation relative to an NVH limit. In one example, engine roughness may be detected by an increase in misfire events.

During the first condition, the decreasing may include decreasing from a target EGR amount based on an engine speed-load condition, and during the second condition, the increasing may include increasing to or beyond the target EGR amount based on the engine speed-load condition. During the first condition an engine misfire monitor may be continued to be enabled whereas during the second condition, a parameter of the misfire monitor may be varied. Indication of engine roughness (first condition) may also be based on a reading of a tachometer coupled to a crankshaft driven member. As described before, indication of road roughness may be based on a plurality of sensors, e.g., crankshaft acceleration sensors, wheel speed sensors, dynamic suspension system sensors, yaw-rate sensors, transmission output shaft sensors, and steering wheel sensors. When it is determined by the controller that the rough road condition no longer exist and the vehicle is being driven on a smooth road, the EGR flow rate may be lowered from the target level in order to reduce potential NVH issues associated with higher EGR level. During smoother road conditions, the vehicle may be continued to be operated with EGR flow rate based on engine operating conditions and NVH constraints.

In another example, the engine may include a knock sensor. While operating the engine with EGR delivered below the target flow rate, engine knock may be indicated in response to knock sensor output being higher than a first threshold; and while operating the engine with EGR delivered at or above the target flow rate, engine knock may be indicated in response to knock sensor output being higher than a second threshold, the second threshold higher than the first threshold.

In this way, in response to an indication of road roughness, an engine controller may selectively adjust one or more engine operating parameters to increase fuel economy, the selectively adjusting including transitioning from a first level associated with lower NVH and combustion instability to a second level associated with higher NVH and combustion instability. For example, where the parameter includes a canister purge flow, the adjusting includes increasing one or more of a purge flow rate and a purge frequency from the first level to the second level. As another example, where the parameter includes a (positive) crankcase ventilation flow, the adjusting includes increasing one or more of a crankcase ventilation flow rate and a crankcase ventilation frequency from the first level to the second level. As yet another example, where the parameter includes a transmission gear shift schedule, the adjusting includes advancing the shift schedule to complete the shift during the rough road condition. Additionally, the adjusting includes transitioning from a first shift schedule with higher spark retard usage to a second shift schedule with lower spark retard usage. As a further example, where the parameter includes a torque converter slip schedule, the adjusting includes transitioning from a first shift schedule with higher slip usage to a second shift schedule with lower slip usage. As still a further example, where the parameter includes an on-board diagnostics (OBD) monitor, the adjusting includes intrusively initiating the monitor to complete a diagnostics routine during the rough road conditions. As another example, where the parameter includes a knock threshold, the adjusting includes transitioning from a first knock threshold associated with less spark advance to a second knock threshold associated with higher spark advance.

Figure 3:
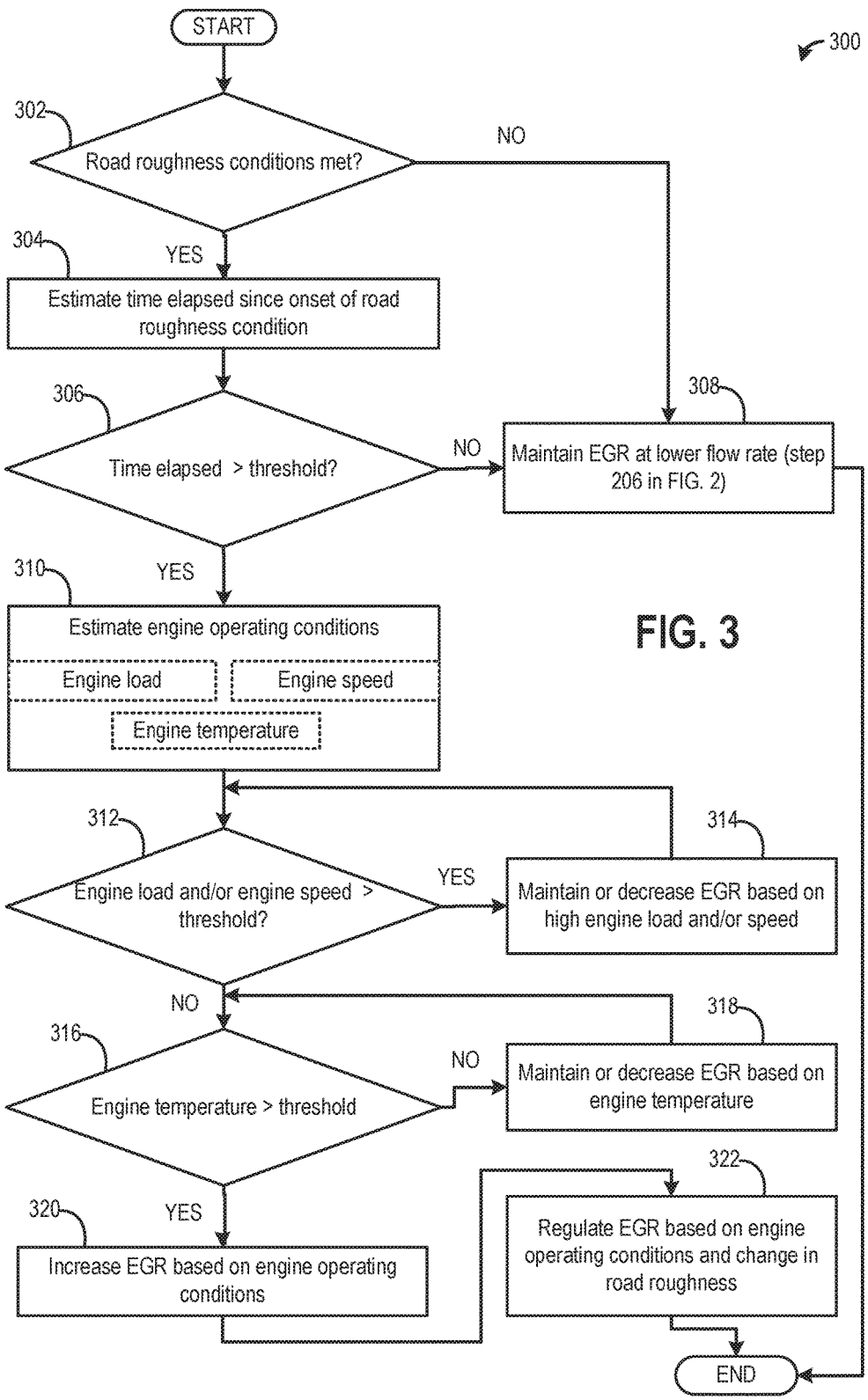
FIG. 3 shows a flow chart illustrating a method that may be implemented for regulating EGR flow rate during rough road conditions.

FIG. 3 shows a flow chart illustrating a method that may be implemented for real time regulation of EGR flow rate during rough road conditions experienced by the vehicle. At 302, the routine includes determining if road roughness conditions are met. Road roughness conditions may include rough roughness levels higher than a threshold level. During rough road conditions, there may be an opportunity to opportunistically increase EGR flow rate since the increased NVH due to the road roughness may mask any noise-vibration-harshness (NVH) resulting from an increase in EGR. If the road roughness condition is below the threshold level, at 308, a lower than target EGR flow rate (as determined in step 206 in FIG. 2) may be maintained. The EGR flow rate may be lowered from the target level taking into account NVH and combustion stability limits.

If it is determined that rough roughness conditions are met, at 304, time elapsed since the onset of higher than threshold level road roughness condition may be estimated. The onset of road roughness condition may be estimated based on inputs from a plurality of vehicle sensors such as crankshaft acceleration sensor, wheel speed sensor, suspension sensor, steering sensor, wheel slippage sensor, and yaw rate sensor. At 306, the routine includes determining if the time elapsed since the onset of road roughness condition is higher than a threshold time period. Engine operating parameters may be adjusted in response to longer than threshold duration of road roughness conditions. If it is determined that the time elapsed since the onset of road roughness condition is lower than the threshold time period, at 308, the low EGR flow rate may be maintained without any change due to road roughness conditions.

If it is determined that the time elapsed since the onset of road roughness condition is higher than the threshold time period, at 310, engine operating conditions that influence EGR flow rate may be estimated. The estimated engine operating conditions may include engine load, engine speed and engine temperature. At 312, the routine includes determining if the engine load and the engine speed is higher than a threshold load and speed respectively. If it is determined that one of engine load and engine speed in higher than the respective threshold, at 314, the EGR flow rate may be adjusted accordingly. Due to high engine load and/or speed, high EGR flow rate may not be desired for engine operations, hence in response to higher than threshold engine load and/or speed, EGR flow rate may be either maintained at a low level (EGR level of step 308) or further reduced to a lower level.

If it is determined that each of engine load and engine speed in lower than the respective thresholds, at 316, the routine includes determining if the engine temperature is higher than a threshold temperature. If it is determined that the engine temperature is lower than the respective threshold, at 318, the EGR flow rate may be adjusted accordingly. Due to low engine temperature (such as during cold start conditions), high EGR flow rate may not be desired for engine operations, hence in response to lower than threshold engine temperature, EGR flow rate may be either maintained at a low level (EGR level of step 308) or further reduced to a lower level.

If it is determined that of the engine temperature is higher than the threshold temperature and each of the engine load and engine speed is lower than the respective thresholds, at 320, EGR flow rate may be increased to the maximum permissible target level based on engine operating parameters. The increase in EGR flow rate may be carried out independent of the NVH limit concerns since any change in NVH due to increased EGR flow may be masked by the prevailing rough road conditions. In one example, EGR flow rate may be increased to a limit until engine misfire is detected and then EGR flow rate may be lowered from that limit in order to prevent increase in misfire events. At 322, as the road roughness conditions prevail, the EGR flow may be continued to be regulated based on engine operating conditions and road roughness levels. In another example if road roughness level increases EGR flow rate may be increased and if the road roughness decreases the EGR flow rate may be suitably decreased. Similarly, EGR flow rate may be adjusted based on changes in engine operating conditions. In this way during rough road conditions, EGR flow rate may be opportunistically increased to improve fuel economy and engine performance.

In some examples, a parameter of a misfire monitor may be varied while operating with the higher EGR flow. As an example, for combustion stability NVH limits, the misfire monitor may operate with a COV of IMEP at ~2%, which may be raised to 5% or higher during the higher EGR flow. As such, since misfires can cause emissions issues, as well as loss of fuel economy (since that portion of the injected fuel event does not create positive torque), misfire monitoring may be continued when operating with the higher EGR flow. In another example, during smoother road conditions, EGR may be calibrated to a first level of variation of IMEP with no misfire. During rougher road conditions, EGR may be calibrated to a higher variation of IMEP with no misfire (or very few, only as necessary to detect the edge of combustion, and used closed loop control to reduce EGR).

Figure 4:
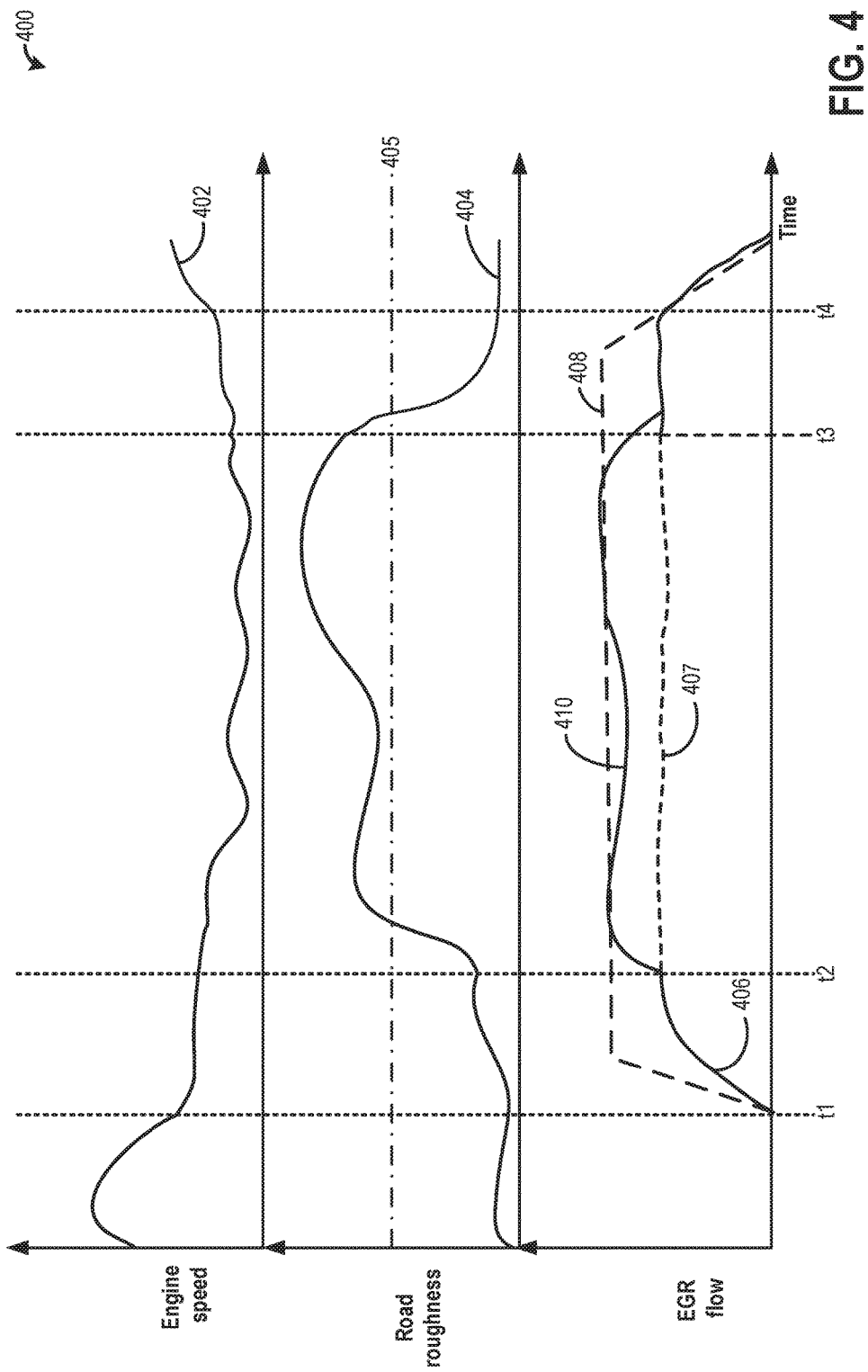
FIG. 4 shows an example of regulating EGR flow rate based on engine operating conditions and road roughness.

FIG. 4 shows an example operating sequence 400 illustrating regulation of exhaust gas recirculation (EGR) flow rate based on engine operating conditions and road roughness conditions. The horizontal axis (x-axis) denotes time and the vertical markers t1-t4 identify significant times in the on-road operation of the vehicle.

The first plot (line 402) from the top shows variation in engine speed over time. The second plot (line 404) shows variation of road roughness on which the vehicle is travelling. The dotted line 405 shows a threshold for road roughness measurement. If the measured road roughness condition at a time is higher than this threshold, higher levels of noise-vibration-harshness (NVH) may be experienced at the vehicle. The third and final plot (line 406) shows EGR flow rate into the engine intake manifold as estimated from engine operating conditions taking into account engine roughness and noise-vibration-harshness (NVH) constraints. The line 408 shows the maximum permissible (target level) EGR flow-rate for the corresponding engine operating conditions, not taking into account any NVH constraints. Line 410 shows EGR flow rate during rough road conditions based on road roughness and engine operating conditions. Dotted line 407 shows EGR flow rate that would have been maintained based on engine operating conditions and NVH constraints if normal driving conditions prevailed.

Prior to time t1, the engine may be operating at a higher speed as shown at line 402. Based on engine operating conditions including engine speed-load, EGR may not be desired. Accordingly the EGR valve may be maintained in a closed position during this time.

Road roughness conditions may be continually estimated based on the output of at least one of crankshaft position sensor, wheel speed sensor(s), steering wheel sensor, yaw-rate sensor, dynamic suspension system sensors and acceleration sensors. Prior to t1, the road is determined to be smooth and the roughness estimate is well below the threshold line 405.

At time t1, due to a change in vehicle operating conditions, the engine speed is lowered. In response to the change in engine speed and load conditions, a higher EGR flow rate may be desired. The desired amount of EGR corresponds to an amount required to achieve fuel efficiency while taking into account NVH constraints. In particular, the EGR level permissible based on only on engine speed and load is shown by line 408. However, due to NVH constraints arising from the elevated EGR, the actual EGR level that is delivered is shown by 406, lower than the level of line 408. Thus, at t1, the engine controller sends a signal to an actuator coupled to the EGR valve, to open the valve to a certain level in order to admit the determined amount of EGR.

Between time t1 and t2, while the road roughness continues to be below the threshold, as seen from lines 406 and 408, the actual EGR level is maintained limited or reduced from the target level for EGR that is permissible for the given engine operating conditions. The EGR flow rate is restricted in order to maintain a comfortable driving experience with low NVH levels. As a result, the full fuel economy potential of the EGR is not achieved.

At time t2, while EGR is still desired, it is observed that the road roughness has significantly increased and a parameter indicative of the road roughness condition is higher than threshold 405.

Between time t2 and t3, due to the increased road roughness, the EGR flow rate may be opportunistically increased to the target level (line 408) for the given engine operating conditions. By increasing the EGR flow rate, the full fuel economy potential of the EGR can be achieved. In particular, the higher fuel economy may be achieved with NVH caused due to the increased EGR flow masked by the NVH experienced from the increased road roughness. Between time t2 and t3, during road roughness conditions, the EGR level may be increased to the target level 408 which is higher than the EGR level (shown by dotted line 407) that would have been maintained for normal road conditions. The difference in EGR levels as shown by the difference between lines 407 and 408 represent the fuel economy improvement that may be achieved by opportunistically increasing EGR level during rough road conditions.

Also between time t2 and t3, while the road roughness condition is above the threshold, there may be variations in road roughness. At any given point of time, the EGR flow rate may be adjusted according to the current road roughness condition. The EGR valve opening may be adjusted accordingly. As seen from the variation of lines 404 and 410, with decrease in road roughness, the EGR flow rate is lowered below the target level in order to ensure that any additional NVH is not experienced by the passengers. Again as the road roughness condition increases, the EGR flow rate may be adjusted to a higher level in order to improve fuel efficiency. However, at all times EGR flow rates is restricted by the upper limit (target level) as determined by the engine operating conditions.

At time t3, is it estimated that the road roughness condition has decreased below the mentioned threshold and consequently the corresponding NVH levels has reduced. Between time t3 and t4, the engine speed is low and EGR may continue to be desired for engine operations. Due to the prevailing smoother road conditions, at time t3, the EGR flow rate is reduced below the target level to account for NVH constraints. The EGR valve is adjusted accordingly to provide the desired EGR flow rate. At time t4, the engine speed increases due to a change in vehicle operating conditions. At this time EGR may not be desired any longer and therefore the EGR valve may be actuated to a closed position.

In this way EGR flow rate may be regulated based on engine operation conditions and road roughness conditions in order to attain desirable fuel efficiency, combustion and emissions-control performance.

Figure 5:
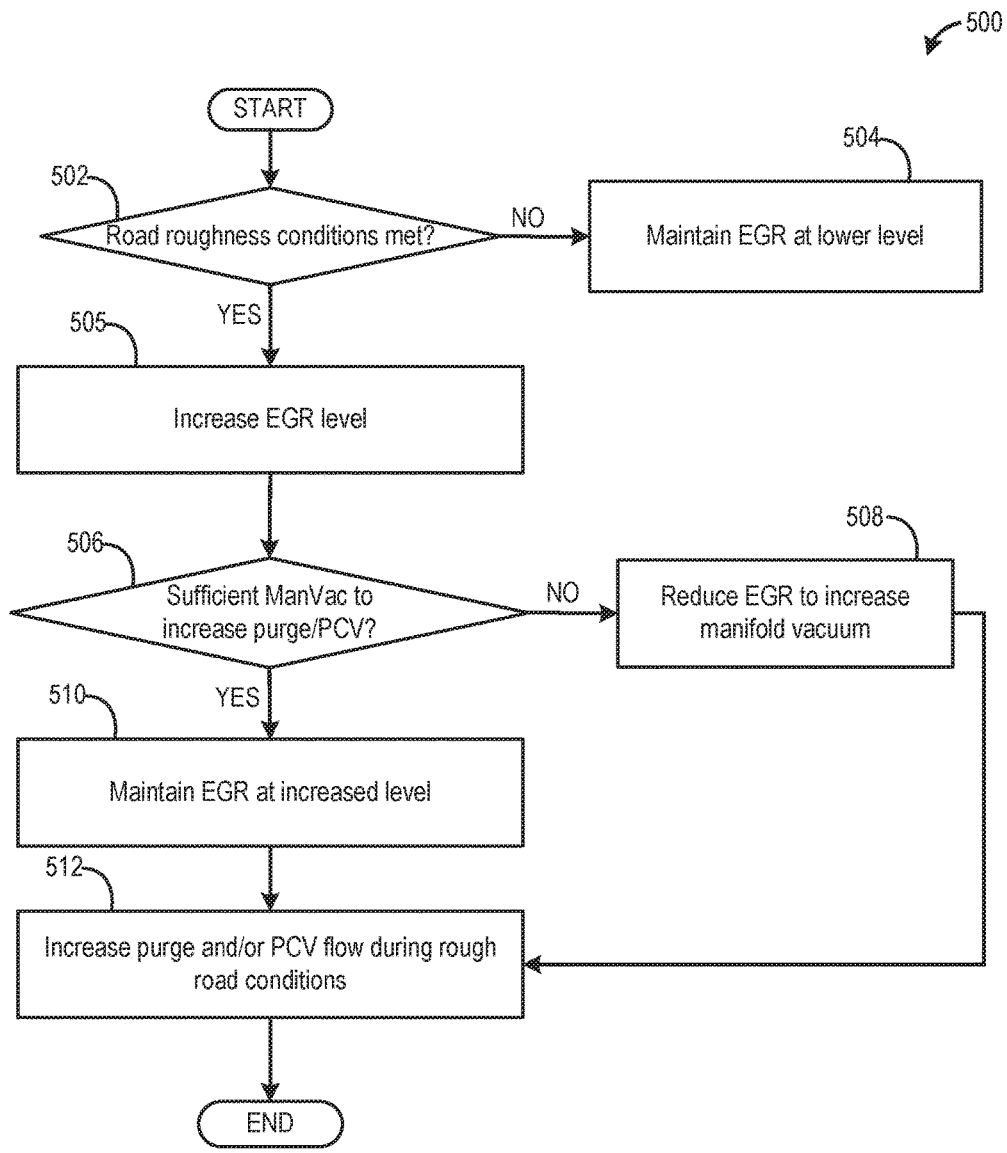
FIG. 5 shows a flow chart illustrating a method that may be implemented for coordinating a purge flow rate with an EGR flow rate during rough road conditions.
Figure 6:
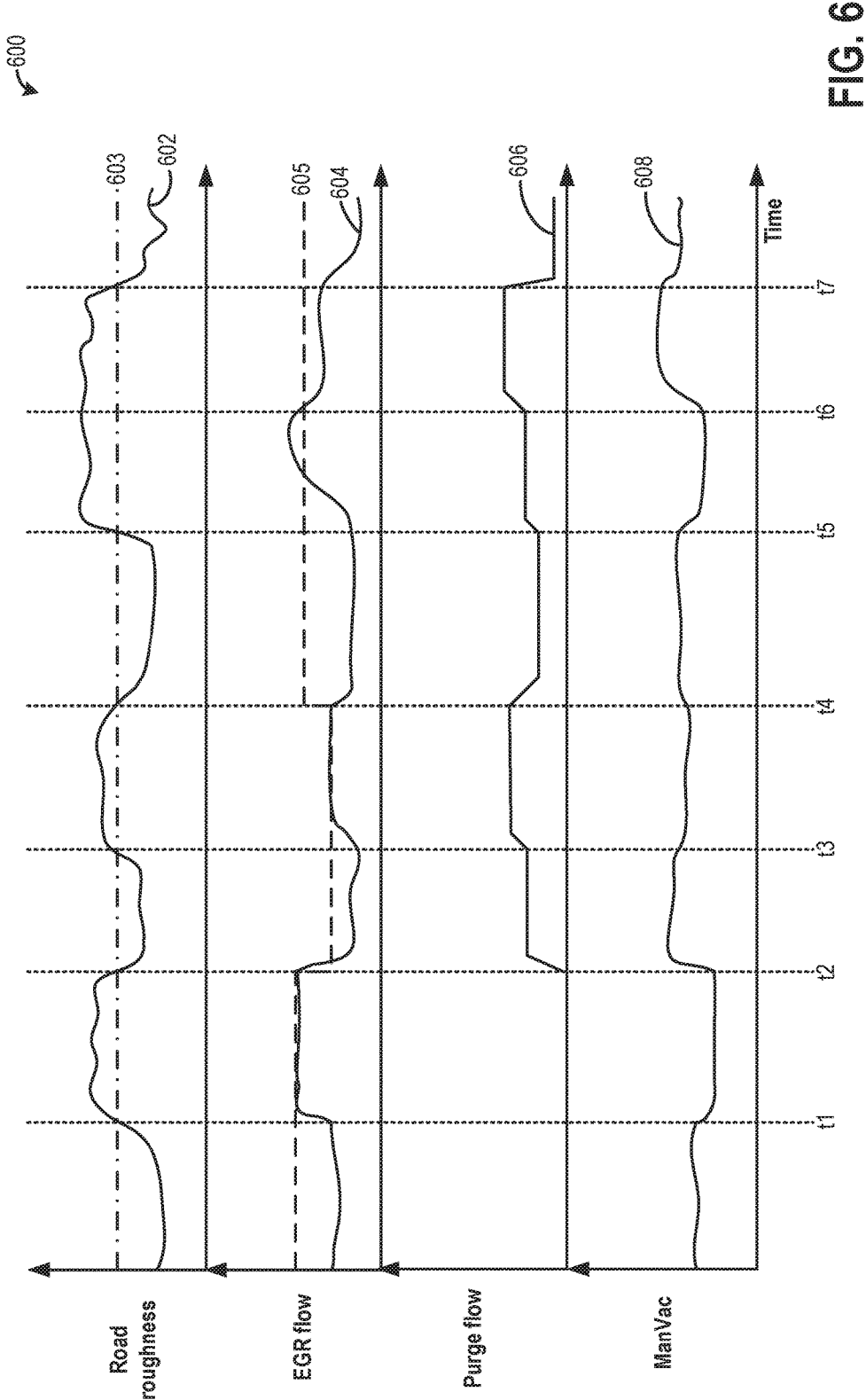
FIG. 6 shows an example of coordinating purge flow rates and EGR flow rates based on engine operating conditions and road roughness.

Turning now to FIG. 5, an example method 500 is shown for coordinating adjustments to an EGR flow rate with adjustments to an alternate engine operating parameter, such as a purge flow rate, during rough road conditions. The coordination allows for additional fuel economy benefits to be achieved.

At 502, it may be confirmed that rough road conditions are met. In one example, this includes confirming that a rough road index based on various vehicle sensors (as discussed at FIG. 3) is higher than a threshold. If rough road conditions are not confirmed, EGR is maintained at a lower NVH constrained level at 504 (e.g., via adjustments to the position of the EGR valve). If rough road conditions are confirmed, EGR is raised to an NVH unconstrained level (or target level) at 505, such as by increasing the opening of the EGR valve.

Next, at 506, it may be determined if there is sufficient manifold vacuum available to increase the purge flow rate (or purge frequency) and/or the PCV flow rate to the engine intake. If not, then at 508, the EGR level may be reduced to increase manifold vacuum, such as by decreasing the opening of the EGR valve. In one example, the EGR level may be reduced to the original lower NVH constrained level. In an alternate example, the EGR level may be reduced below the target NVH unconstrained level, while maintaining the EGR level above the NVH constrained level. From there the routine moves to 510 to increase the purge and/or PCV flow during the rough road conditions. For example, the controller may increase the opening of the canister purge valve and/or the PCV valve, while applying the intake manifold vacuum to the fuel vapor canister and/or crankcase to draw in the fuel vapors. If sufficient vacuum is available even with EGR at the NVH unconstrained level, the routine maintains EGR at the increased level at 510, and proceeds to 512 to increase the purge and/or PCV flow rate.

In this way, when transitioning the one or more engine operating parameters (herein PCV and purge flow) from a first level associated with lower NVH to a second level associated with higher NVH, the transitioning may be adjusted based on the intake manifold vacuum level. Specifically, an EGR flow from the engine exhaust to the engine intake may be reduced during the transitioning when the intake manifold vacuum level is lower, and the EGR flow may be maintained or increased during the transitioning when the intake manifold vacuum level is higher. In this way, EGR adjustments responsive to rough road conditions may be varied based on the vacuum requirement for other adjustments responsive to rough road conditions. The technical effect of the adjustments is that fuel economy benefits from multiple engine operating parameters may be achieved concurrently while rough road conditions are leveraged to mask the associated NVH.

FIG. 6 shows an example operating sequence 600 illustrating coordination of an EGR flow rate with a purge flow rate based on engine operating conditions and road roughness conditions. The horizontal axis (x-axis) denotes time and the vertical markers t1-t6 identify significant times in the on-road operation of the vehicle. Sequence 600 depicts a road roughness index at plot 603, EGR flow at plot 604, canister purge flow at plot 606, and intake manifold vacuum levels (ManVac) at plot 608. Dotted line 605 depicts a target NVH unconstrained EGR flow rate that would be desired based on existing engine operating conditions and independent of NVH constraints.

During vehicle operation, road roughness conditions may be continually estimated based on the output of at least one of crankshaft position sensor, wheel speed sensor(s), steering wheel sensor, yaw-rate sensor, dynamic suspension system sensors and acceleration sensors. Prior to t1, the road roughness index is below threshold 603 and therefore the road is determined to be smooth. Also prior to t1, canister purging conditions may not be met (e.g., canister load may be lower than a threshold) and therefore purging is not enabled.

Also prior to t1, engine operating conditions may require EGR flow to be at target level 605, however, due to NVH constraints on the smooth road conditions, an actual EGR flow provided to the engine (plot 604) may be held lower than the target level via adjustments to a position of the EGR valve.

At t1, the road roughness index may exceed threshold 603 and therefore the road is determined to be rough. Purging conditions continue to not be met, so purge is maintained disabled. However, during the rough road conditions between t1 and t2, the EGR flow is opportunistically increased to the target level.

At t2, the road roughness index once again is below threshold 603 and therefore the road is determined to be smooth. As a result, EGR flow is once again limited below the target level. Also at t2, canister purging conditions may be met (e.g., canister load may be higher than a threshold) and therefore purging is enabled. Accordingly, a purge valve is opened allowing purge flow to be provided to the engine.

At t3, the road roughness index may once again exceed threshold 603 and therefore the road is determined to be rough. During the rough road conditions, the EGR flow is opportunistically increased to the target level. In addition, since purging conditions continue to be met, purge is also opportunistically increased. In particular, during the rough road condition between t3 and t4 there is sufficient manifold vacuum even after EGR flow is increased. Consequently, the purge flow can be increased while the EGR flow is also increased to the target level.

At t4, the road roughness index once again is below threshold 603 and therefore the road is determined to be smooth. As a result, EGR flow is once again limited below the target level. In addition, while canister purging conditions continue to be met, the purge flow is also reduced to address NVH constraints.

At t5, the road roughness index once again exceeds threshold 603 and therefore the road is determined to be rough. During a first portion of the rough road condition, between t5 and t6, the EGR flow is opportunistically increased above the target level. In addition, since purging conditions continue to be met, purge is also opportunistically increased. However, to enable a more complete purging of the canister to be opportunistically completed during the given rough road condition, more manifold vacuum would be required which is not available. That is, purge flow could be elevated even further during the rough road condition but there is not enough manifold vacuum to do so.

To enable purging to be completed, at t6, EGR flow is decreased so as to provide sufficient intake manifold vacuum. Consequently, between t6 and t7, while the rough road conditions persist, EGR flow is decreased from the target level while still staying above the NVH limited level (that was used prior to t5) while purge flow is further increased.

At t7, the road roughness index returns below threshold 603 and therefore the road is determined to be smooth. As a result, EGR flow is once again limited below the target level. In addition, due to canister purging being substantially completed, the purge flow is disabled or significantly reduced.

In this way, during a first condition, in response to an indication of road roughness, a flow of canister purge fuel vapors to an engine intake is increased while concurrently decreasing an amount of EGR delivered to the engine intake. In comparison, during a second condition, in response to the indication of road roughness, the flow of canister purge fuel vapors to the engine intake is increased while concurrently maintaining or increasing the amount of EGR delivered to the engine intake. In one example, during the first condition, an intake manifold vacuum level is lower while during the second condition, the intake manifold vacuum level is higher. In another example, during the first condition, a canister load is higher while during the second condition, the canister load is lower. In yet another example, during the first condition, a duration of the rough road condition is smaller while during the second condition, the duration of the rough road condition is larger. In still another example, during the first condition, the indication of rough roughness is higher while during the second condition, the indication of road roughness is lower. In a further example, during the first condition, a flow of crankcase fuel vapors to the engine intake is increased while during the second condition, an OBD monitor is intrusively initiated.

In this way, by opportunistically adjusting one or more engine operating parameters, for example, EGR flow, purge frequency, and transmission shift scheduling, during conditions of elevated road roughness, higher engine fuel economy and better emissions quality may be achieved. By masking the NVH associated with the elevated EGR or purge levels, or the transmission gear shift, using NVH associated with rough road conditions, fuel economy may be improved. For example, a higher EGR usage may be enabled, improving engine fuel economy and emissions. Likewise, a higher purge frequency can be enabled which improves fuel economy. By coordinating EGR flow adjustments with purge adjustments during rough road conditions, sufficient manifold vacuum may be provided for a more complete cleaning of a fuel vapor canister over a given vehicle drive cycle. The technical effect of opportunistically increasing engine fuel vapor ingestion (from EGR, purge or PCV, for example) during rough road conditions is that a higher fuel economy and improved emissions benefits may be achieved without an operator perceiving additional NVH. This method of improving fuel efficiency during rough road conditions may be of particular advantage in global markets where road conditions are generally poor.

One example method for a vehicle engine comprises: in response to an indication of road roughness, selectively increasing an EGR flow rate to the engine. In the preceding example, additionally or optionally, the indication of road roughness is based on one or more of crankshaft acceleration, a wheel speed sensor, a suspension sensor, a steering sensor, wheel slippage, yaw, and navigational input. In any or all of the preceding examples, additionally or optionally, the selectively increasing includes increasing responsive to the indication of road roughness being higher than a threshold, the EGR flow rate increased from a first EGR level based on engine speed-load conditions and an engine NVH limit to a second EGR level based on the engine speed-load conditions and independent of the engine NVH limit. In any or all of the preceding examples, additionally or optionally, the selectively increasing further includes, responsive to the indication of road roughness being lower than the threshold, maintaining the EGR flow rate and maintaining operation of an engine misfire monitor. In any or all of the preceding examples, additionally or optionally, the method further comprises, while operating the engine with the increased EGR flow rate, varying a parameter of a misfire monitor, and wherein increasing the EGR flow rate includes increasing an opening of an EGR valve coupled in a low pressure EGR passage. In any or all of the preceding examples, additionally or optionally, the increasing is further based on an indication of engine roughness, the EGR flow rate increased until an engine misfire count is higher than a threshold, and then decreasing the EGR flow rate. In any or all of the preceding examples, additionally or optionally, the increasing is at a higher rate than the decreasing. In any or all of the preceding examples, additionally or optionally, the method further comprises, while operating the engine with the increased EGR flow rate, transitioning a knock threshold of an engine knock sensor from a first knock threshold associated with less spark advance to a second knock threshold associated with higher spark advance. In any or all of the preceding examples, additionally or optionally, the method further comprises, while operating the engine with the increased EGR flow rate, increasing one or more of a canister purge flow and a crankcase ventilation flow into the engine intake, the increased based on an intake manifold vacuum level. In any or all of the preceding examples, additionally or optionally, the method further comprises, while operating the engine with the increased EGR flow rate, transitioning a transmission gear shift schedule from a first shift schedule with higher spark retard usage to a second shift schedule with lower spark retard usage, and transitioning a torque converter slip schedule from a first shift schedule with higher slip usage to a second shift schedule with lower slip usage. In any or all of the preceding examples, additionally or optionally, the method further comprises, while operating the engine with the increased EGR flow rate, intrusively initiating an OBD monitor, the initiating adjusted to complete a diagnostics routine of the OBD monitor while the indication of road roughness persists.

Another example method for an engine coupled to an on-road vehicle comprises: during a first condition, in response to an indication of engine roughness, decreasing an amount of EGR delivered to an engine; and during a second condition, in response to an indication of road roughness, increasing an amount of EGR delivered to the engine. In the preceding example, additionally or optionally, during the first condition, the decreasing is based on engine operation relative to an engine combustion stability limit; and during the second condition, the increasing is based on engine operation relative to an NVH limit. In any or all of the preceding examples, additionally or optionally, during the first condition, the decreasing includes decreasing from a target EGR amount based on an engine speed-load condition, and wherein during the second condition, the increasing includes increasing to or beyond the target EGR amount based on the engine speed-load condition. In any or all of the preceding examples, additionally or optionally, the method further comprises, during the first condition, maintaining a threshold for an engine misfire monitor, and during the second condition, raising the threshold for the engine misfire monitor. In any or all of the preceding examples, additionally or optionally, the indication of engine roughness is based on a reading of a tachometer coupled to a crankshaft driven member and wherein the indication of road roughness is based on crankshaft acceleration sensors, wheel speed sensors, dynamic suspension system sensors, yaw-rate sensors, steering wheel sensors. In any or all of the preceding examples, additionally or optionally, the method further comprises, during the first condition, maintaining a knock or pre-ignition threshold of an engine abnormal combustion monitor, and during the second condition, raising the knock or pre-ignition threshold of the engine abnormal combustion monitor.

Another example vehicle system comprises: an engine including an intake manifold and an exhaust manifold; an EGR passage including an EGR valve for recirculating exhaust gas from the exhaust manifold to the intake manifold; one or more sensors coupled to the vehicle for estimating a road roughness during vehicle travel; and a controller. The controller may be configured with computer-readable instructions stored on non-transitory memory for: based on engine conditions, estimating a target EGR flow rate; when the estimated road roughness is lower than a threshold, operating the engine with EGR delivered below the target flow rate; and when the estimated road roughness is higher than a threshold, operating the engine with EGR delivered at or above the target flow rate. In the preceding example, additionally or optionally, when the estimated road roughness is lower than the threshold, maintaining the EGR flow rate below the target flow rate. In any or all of the preceding examples, additionally or optionally, the vehicle system further includes a knock sensor coupled to the engine, the controller including further instructions for: while operating the engine with EGR delivered below the target flow rate, indicating engine knock in response to knock sensor output being higher than a first threshold; and while operating the engine with EGR delivered at or above the target flow rate, indicating engine knock in response to knock sensor output being higher than a second threshold, the second threshold higher than the first threshold.

Another example method for an engine comprises: in response to an indication of road roughness, selectively adjusting one or more engine operating parameters to increase fuel economy, the selectively adjusting including transitioning from a first level associated with lower NVH and combustion instability to a second level associated with higher NVH and combustion instability. In the preceding example, additionally or optionally, the one or more engine operating parameters includes a purge flow, the selectively adjusting including increasing one or more of a purge flow rate and a purge frequency from the first level to the second level. In any or all of the preceding examples, additionally or optionally, the one or more engine operating parameters includes a crankcase ventilation flow, the selectively adjusting including increasing one or more of a crankcase ventilation flow rate and a crankcase ventilation frequency from the first level to the second level. In any or all of the preceding examples, additionally or optionally, the one or more engine operating parameters includes a transmission gear shift schedule, the selectively adjusting including advancing a shift schedule to complete the shift during the rough road conditions. In any or all of the preceding examples, additionally or optionally, the one or more engine operating parameters includes a transmission gear shift schedule, the selectively adjusting including transitioning from a first shift schedule with higher spark retard usage to a second shift schedule with lower spark retard usage. In any or all of the preceding examples, additionally or optionally, the one or more engine operating parameters includes a torque converter slip schedule, the selectively adjusting including transitioning from a first shift schedule with higher slip usage to a second shift schedule with lower slip usage. In any or all of the preceding examples, additionally or optionally, the one or more engine operating parameters includes an on-board diagnostics (OBD) monitor, the selectively adjusting including intrusively initiating the monitor to complete a diagnostics routine during the rough road conditions. In any or all of the preceding examples, additionally or optionally, the engine includes a variable cam timing device, and wherein the one or more engine operating parameters includes an exhaust cam phasing schedule. In any or all of the preceding examples, additionally or optionally, the one or more engine operating parameters includes a knock threshold, the selectively adjusting including transitioning from a first knock threshold associated with less spark advance to a second knock threshold associated with higher spark advance. In any or all of the preceding examples, additionally or optionally, the selectively adjusting is based on an intake manifold vacuum level, the method further comprising reducing an EGR flow from an engine exhaust to an engine intake during the transitioning when the intake manifold vacuum level is lower, and maintaining or increasing the EGR flow during the transitioning when the intake manifold vacuum level is higher.

Still another example method for an engine comprises: during a first condition, in response to an indication of road roughness, increasing a flow of canister purge fuel vapors to an engine intake while concurrently decreasing an amount of EGR delivered to the engine intake; and during a second condition, in response to the indication of road roughness, increasing the flow of canister purge fuel vapors to the engine intake while concurrently maintaining or increasing the amount of EGR delivered to the engine intake. In the preceding example, additionally or optionally, during the first condition, an intake manifold vacuum level is lower, and wherein during the second condition, the intake manifold vacuum level is higher. In any or all of the preceding examples, additionally or optionally, during the first condition, a canister load is higher, and wherein during the second condition, the canister load is lower. In any or all of the preceding examples, additionally or optionally, during the first condition, a duration of the rough road condition is smaller, and wherein during the second condition, the duration of the rough road condition is larger. In any or all of the preceding examples, additionally or optionally, during the first condition, the indication of rough roughness is higher, and wherein during the second condition, the indication of road roughness is lower. In any or all of the preceding examples, additionally or optionally, the method further comprises, during the first condition, increasing a flow of crankcase fuel vapors to the engine intake, and during the second condition, intrusively initiating an OBD monitor.

Another example vehicle system comprises an engine including an intake manifold and an exhaust manifold; a canister for storing fuel vapors, the canister coupled to the intake manifold via a canister purge valve; a crankcase coupled to the intake manifold via a crankcase purge valve; a transmission with a plurality of gear sets, the transmission coupling the engine to vehicle wheels; a knock sensor coupled to an engine block; an EGR passage including an EGR valve for recirculating exhaust gas from the exhaust manifold to the intake manifold; one or more sensors coupled to the vehicle for estimating a road roughness during vehicle travel; and a controller. The controller may be configured with computer-readable instructions stored on non-transitory memory for: when the estimated road roughness is higher than a threshold, increasing EGR flow above a target flow rate based on engine operating conditions until intake manifold vacuum is at a threshold vacuum; and applying the intake manifold vacuum to the canister to increase a purge flow to the engine, wherein the threshold vacuum is based at least on a hydrocarbon load of the canister. In the preceding example, additionally or optionally, the system further comprises a navigational system, wherein the controller includes further instructions for: predicting an onset and a duration of rough road conditions based on input from the navigational system; advancing a shift schedule of a transmission gear shift based on the predicted onset and duration to complete the gear shift during the rough road conditions; and intrusively initiating an on-board diagnostics (OBD) monitor based on the predicted onset and duration to complete a diagnostics routine of the monitor during the rough road conditions. In any or all of the preceding examples, additionally or optionally, the system further comprises a torque converter coupling the engine to the transmission, wherein the controller includes further instructions for: when performing a transmission gear shift during the rough road conditions, slipping a lock-up clutch of the torque converter less; and when performing the transmission gear shift outside the rough road conditions, slipping the lock-up clutch of the torque converter more. In any or all of the preceding examples, additionally or optionally, the controller includes further instructions for: when the estimated road roughness is lower than the threshold, indicating engine knock responsive to an output of the knock sensor exceeding a first knock threshold, and retarding spark ignition timing by a first amount responsive to the indication of engine knock; and when the estimated road roughness is higher than the threshold, indicating engine knock responsive to an output of the knock sensor exceeding a second knock threshold, the second knock threshold higher than the first knock threshold, and retarding spark ignition timing by a second amount responsive to the indication of engine knock, the second amount smaller than the first amount.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
    indicating road roughness based on one or more of crankshaft acceleration, a wheel speed sensor, a suspension sensor, a steering sensor, wheel slippage, yaw, and navigational input,
    in response to an indication of road roughness, selectively adjusting one or more engine operating parameters to increase fuel economy, the selectively adjusting including transitioning from a first level associated with lower NVH and combustion instability to a second level associated with higher NVH and combustion instability.

2. The method of claim 1, wherein the one or more engine operating parameters includes a purge flow, the selectively adjusting including increasing one or more of a purge flow rate and a purge frequency from the first level to the second level.

3. The method of claim 1, wherein the one or more engine operating parameters includes a crankcase ventilation flow, the selectively adjusting including increasing one or more of a crankcase ventilation flow rate and a crankcase ventilation frequency from the first level to the second level.

4. The method of claim 1, wherein the one or more engine operating parameters includes a transmission gear shift schedule, the selectively adjusting including advancing a shift schedule to complete the transmission gear shift during the rough road conditions.

5. The method of claim 1, wherein the one or more engine operating parameters includes a transmission gear shift schedule, the selectively adjusting including transitioning from a first shift schedule with higher spark retard usage to a second shift schedule with lower spark retard usage.

6. The method of claim 1, wherein the one or more engine operating parameters includes a torque converter slip schedule, the selectively adjusting including transitioning from a first shift schedule with higher slip usage to a second shift schedule with lower slip usage.

7. The method of claim 1, wherein the one or more engine operating parameters includes an on-board diagnostics (OBD) monitor, the selectively adjusting including intrusively initiating the monitor to complete a diagnostics routine during rough road conditions.

8. The method of claim 1, wherein the engine includes a variable cam timing device, and wherein the one or more engine operating parameters includes an exhaust cam phasing schedule.

9. The method of claim 1, wherein the one or more engine operating parameters includes a knock threshold, the selectively adjusting including transitioning from a first knock threshold associated with less spark advance to a second knock threshold associated with higher spark advance.

10. The method of claim 1, wherein the selectively adjusting is based on an intake manifold vacuum level, the method further comprising reducing an EGR flow from an engine exhaust to an engine intake during the transitioning when the intake manifold vacuum level is lower, and maintaining or increasing the EGR flow during the transitioning when the intake manifold vacuum level is higher.

11. A method for an engine, comprising:
during a first condition, in response to an indication of road roughness, based on a vehicle sensor, increasing a flow of canister purge fuel vapors to an engine intake while concurrently decreasing an amount of EGR delivered to the engine intake; and
during a second condition, in response to the indication of road roughness, increasing the flow of canister purge fuel vapors to the engine intake while concurrently maintaining or increasing the amount of EGR delivered to the engine intake.

12. The method of claim 11, wherein during the first condition, an intake manifold vacuum level is lower, and wherein during the second condition, the intake manifold vacuum level is higher.

13. The method of claim 11, wherein during the first condition, a canister load is higher, and wherein during the second condition, the canister load is lower.

14. The method of claim 11, wherein during the first condition, a duration of a rough road condition is smaller, and wherein during the second condition, the duration of the rough road condition is larger.

15. The method of claim 11, wherein during the first condition, the indication of rough roughness is higher, and wherein during the second condition, the indication of road roughness is lower.

16. The method of claim 11, further comprising, during the first condition, increasing a flow of crankcase fuel vapors to the engine intake, and during the second condition, intrusively initiating an OBD monitor.

17. A vehicle system, comprising:
an engine including an intake manifold and an exhaust manifold;
a canister for storing fuel vapors, the canister coupled to the intake manifold via a canister purge valve;
a crankcase coupled to the intake manifold via a crankcase purge valve;
a transmission with a plurality of gear sets, the transmission coupling the engine to vehicle wheels;
a knock sensor coupled to an engine block;
an EGR passage including an EGR valve for recirculating exhaust gas from the exhaust manifold to the intake manifold;
one or more sensors coupled to the vehicle for estimating a road roughness during vehicle travel; and
a controller with computer-readable instructions stored on non-transitory memory for:
when the estimated road roughness is higher than a threshold,
increasing EGR flow above a target flow rate based on engine operating conditions until intake manifold vacuum is at a threshold vacuum; and
applying the intake manifold vacuum to the canister to increase a purge flow to the engine, wherein the threshold vacuum is based at least on a hydrocarbon load of the canister.

18. The system of claim 17, further comprising a navigational system, wherein the controller includes further instructions for:
predicting an onset and a duration of rough road conditions based on input from the navigational system;
advancing a shift schedule of a transmission gear shift based on the predicted onset and duration to complete the gear shift during rough road conditions; and
intrusively initiating an on-board diagnostics (OBD) monitor based on the predicted onset and duration to complete a diagnostics routine of the monitor during the rough road conditions.

19. The system of claim 18, further comprising a torque converter coupling the engine to the transmission, wherein the controller includes further instructions for:
when performing a transmission gear shift during the rough road conditions, slipping a lock-up clutch of the torque converter less; and
when performing the transmission gear shift outside the rough road conditions, slipping the lock-up clutch of the torque converter more.

20. The system of claim 17, wherein the controller includes further instructions for:
when the estimated road roughness is lower than the threshold, indicating engine knock responsive to an output of the knock sensor exceeding a first knock threshold, and retarding spark ignition timing by a first amount responsive to the indication of engine knock; and
when the estimated road roughness is higher than the threshold, indicating engine knock responsive to an output of the knock sensor exceeding a second knock threshold, the second knock threshold higher than the first knock threshold, and retarding spark ignition timing by a second amount responsive to the indication of engine knock, the second amount smaller than the first amount.

* * * * *